United States Patent [19]
Ueda et al.

[11] Patent Number: 5,429,156
[45] Date of Patent: Jul. 4, 1995

[54] PNEUMATIC TRANSMISSION APPARATUS

[76] Inventors: Kazuyuki Ueda, 2670-126, Tarumi; Hirayoshi Naito, 1568 Kanbe, Ooaza, both of Tsu-shi, Mie-ken, Japan

[21] Appl. No.: 156,014

[22] Filed: Nov. 23, 1993

[30] Foreign Application Priority Data

Nov. 24, 1992 [JP] Japan .............................. 4-086886 U

[51] Int. Cl.⁶ .............................................. B65G 53/42
[52] U.S. Cl. .................................... 137/888; 406/92; 406/194; 417/194; 417/197
[58] Field of Search ............... 137/888; 406/92, 94, 406/95, 194; 417/194, 197

[56] References Cited
U.S. PATENT DOCUMENTS

Re. 24,716 10/1959 Anselman ...................... 406/92 X
1,686,713 10/1928 Scott ................................ 406/194
2,821,346 1/1958 Fisher ......................... 406/194 X

FOREIGN PATENT DOCUMENTS 58909 11/1967 Germany .

Primary Examiner—Robert G. Nilson
Attorney, Agent, or Firm—Peter Jon Gluck; Morrison Law Firm; Thomas R. Morrison

[57] ABSTRACT

A spiral flow connector imparts a spiral flow of air to urge parts being transmitted toward a central axis to avoid contact with the walls of the transmission passages of a pneumatic transmission apparatus. The invention is especially useful for preventing damage to fragile parts such as small resin molds, metal parts or powdered material. The spiral air flow prevents air stalling in the transmission passages.

3 Claims, 3 Drawing Sheets

PNEUMATIC TRANSMISSION APPARATUS

BACKGROUND OF THE INVENTION

The present invention relates to a pneumatic transmission apparatus for carrying materials such as small resin molds, metal parts or powdered material.

Two basic types of transmission apparatus for carrying materials such as resin molds, metal parts, or powdered material, are known in the prior art. These are a pressurized air introduction type and air suction type.

In the former apparatus, a pressurized air supply is connected to an inlet of a tubular transmission passage. A flow of air produced within the tubular transmission passage by the pressurized air supply, carries materials from the inlet through the transmission passage to an outlet.

The latter apparatus has an overall structure similar to the former. An air suction means is connected to the outlet of the tubular transmission passage. The applied suction produces a flow of air within the tubular transmission passage, which carries materials from the inlet through the passage to the outlet.

In both types of device, materials are transmitted by straight air flow in the tubular transmission passage. As a consequence, stalled air flow may occur within the transmission passage. The transmission distance is limited, since long distance transmission increases the likelihood of stalled flow. In addition, regulation of travel speed is difficult and the prior art apparatus is not suitable for low speed transmission of materials.

When the tubular transmission passage contains a corner or sharp bend, parts being transmitted may collide with each other, or impact or rub against inner surface of the tubular transmission passage, thereby causing damage to the parts, and wear of the tubular transmission passage. Therefore, the prior art apparatus is not suitable for transmission of fragile materials which would be damaged by even minor impact.

OBJECTS AND SUMMARY OF THE INVENTION

Accordingly, it is an object of the invention to provide a pneumatic transmission apparatus for carrying materials such as small resin molds, metal parts or powdered material, which overcomes the drawbacks of the prior art.

It is a further object of the invention to provide a pneumatic transmission apparatus which permits transmission over a long distance.

It is a still further object of the invention to provide a pneumatic transmission apparatus wherein the transmission speed is easily regulated.

It is a still further object of the invention to provide a pneumatic transmission apparatus wherein parts being transmitted do not collide with each other, or impact or rub against the inner surface of the tubular transmission passage.

Briefly stated, there is provided a spiral flow connector which imparts a spiral flow of air to urge parts being transmitted toward a central axis to avoid contact with the walls of the transmission passages of a pneumatic transmission apparatus. The invention is especially useful for preventing damage to fragile parts such as small resin molds, metal parts or powdered material. The spiral air flow prevents air stalling in the transmission passages.

In accordance with these and other objects of the invention, there is provided a pneumatic transmission apparatus which comprises: a first and second tubular transmission passage, means for interconnecting the first and the second tubular transmission passage, the means for interconnecting including means for introducing air moving in a direction into the means for interconnecting, the means for introducing air including means for generating a spiral air flow moving in the direction within said second tubular transmission passage.

According to feature of the invention, there is further provided a pneumatic transmission apparatus which comprises: a first and a second tubular transmission passage, a connecter including means for joining the first tubular transmission passage with the second tubular transmission passage, the connector including a lower stream member and an upper stream member, an outlet at a downstream side of the lower stream member, an inlet at an upstream side of the upper stream member, the lower and upper stream members including means for joining an upstream side of the lower stream member to a downstream side of the upper stream member, the upstream member and the downstream member forming a continuous passage within the connector, connecting the inlet with the outlet, a port for receiving a supply of pressurized air, the port being disposed between the inlet and the outlet, an annular passage in communication with the port within the connector, the annular passage disposed coaxially about the continuous passage, the annular passage defined by boundaries of both the lower and upper stream members, the continuous passage including a lower stream passage, a plurality of jet passes providing communication between the annular passage and the lower stream passage, the lower stream passage being disposed between discharge openings of the plurality of jet passes and the outlet, the plurality of jet passes each having a discharge angle facing at least partially downstream, each discharge angle having a directional component tangential to an inner circumferential wall of the lower stream passage, whereby air, discharged into the lower stream passage from the plurality of jet passes, produces a spiral air flow exiting the outlet and a suction at the inlet.

According to a still further feature of the invention, there is still further provided a connector for use in a pneumatic transmission apparatus, which comprises: the connector having an inlet disposed at an upstream side and an outlet disposed at a downstream side, a continuous passage connecting the inlet with the outlet, a port for receiving a supply of pressurized air, the port being disposed between the inlet and the outlet, an annular passage in communication with the port within the connector, the annular passage disposed coaxially about the continuous passage, the continuous passage including a lower stream passage, a plurality of jet passes providing communication between the annular passage and the lower stream passage, the lower stream passage being disposed between discharge openings of the plurality of jet passes and the outlet, the plurality of jet passes each having a discharge angle facing at least partially downstream, each of the discharge angles having a directional component tangential to an inner circumferential wall of the lower stream passage, whereby air, discharged into the lower stream passage from the plurality of jet passes, produces a spiral air flow exiting the outlet and a suction at the inlet.

According to a still further feature of the invention, there is still further provided a connector for a pneumatic transmission apparatus which comprises: a central passage, inlet means for admitting a material to be transmitted to the central passage, outlet means for discharging said material from the central passage, means for supplying a flow of a gas into the central passage, and the means for supplying including means for producing a spiral flow of the gas directed toward the outlet means, whereby material entering the inlet means is urged through the connector and in a spiral path through the outlet means.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
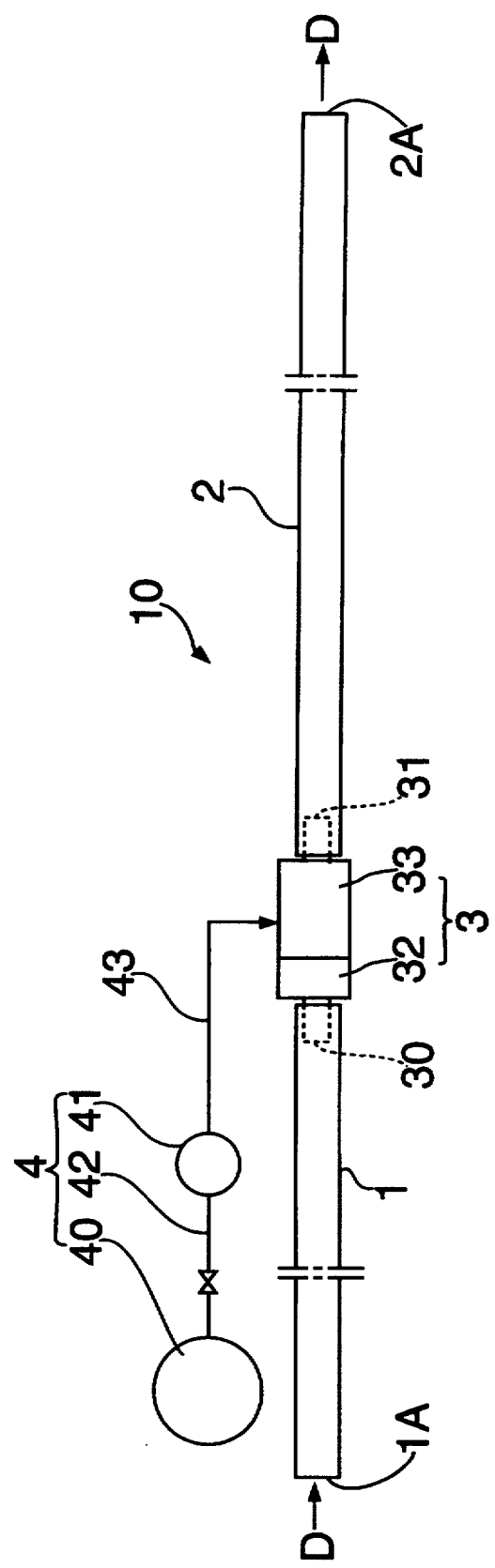
FIG. 1 is a schematic diagram of a pneumatic transmission apparatus according to an embodiment of the present invention.
Figure 2:
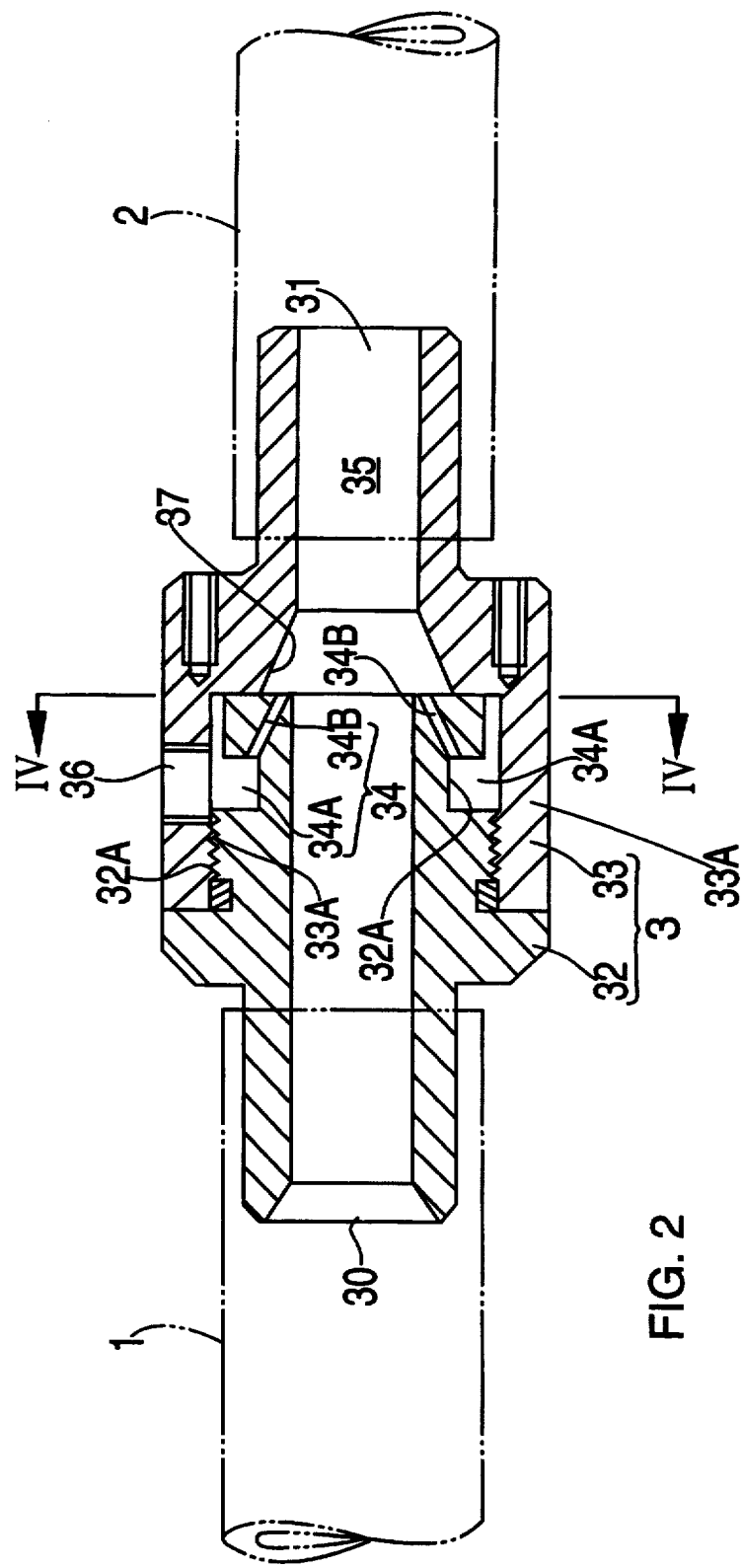
FIG. 2 is a sectional view of an embodiment of the connector of FIG. 1.
Figure 3:
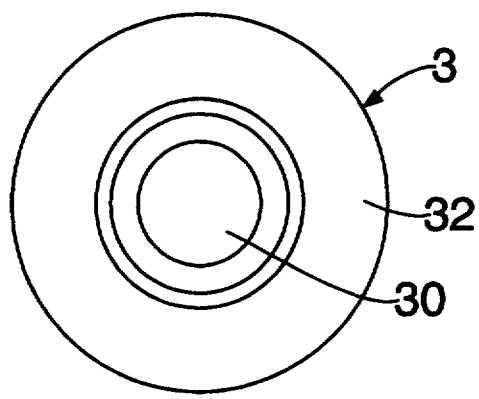
FIG. 3 is a left side view of FIG. 2.

Referring now to FIG. 1, there is shown, generally at 10, a pneumatic transmission apparatus having first tubular transmission passage 1, a second tubular transmission passage 2, a connector 3 and a high pressure air supply line 4. Air flows through pneumatic transmission apparatus 10 in a direction as indicated by arrows D, as will be described in further detail below.

First tubular transmission passage 1 and second tubular transmission passage 2 are made of any suitable material such as, for example, air-tight, flexible vinyl hose. First tubular transmission passage 1 is connected to an inlet 30 of connector 3 and second tubular transmission passage 2 is connected to an outlet 31 of connector 3.

As shown in FIG. 2 to FIG. 5, connector 3 consists of an upper stream member 32 and a lower stream member 33. Upper stream member 32 has inlet 30 disposed at the upstream side and a male screw 32a on the downstream side. Lower stream member 33 is securely connected to upper stream member 32 by a female screw 33a which engages male screw 32a. Lower stream member has outlet 31 disposed at its downstream side.

Figure 4:
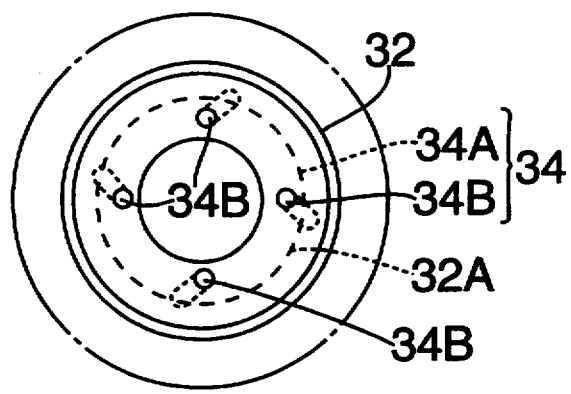
FIG. 4 is a view taken on line IV—IV of FIG. 2.
Figure 5:
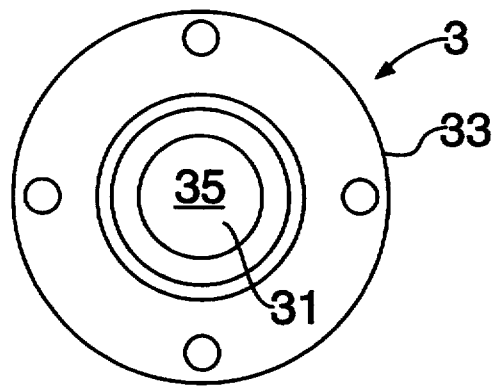
FIG. 5 is a right side view of FIG. 2.

Connector 3 is formed with a spiral flow generating passage 34. Spiral flow generating passage 34 consists of an annular passage 34A and a plurality of jet passes 34B. The boundaries of annular passage 34A are defined by the combination of an annular groove 32A formed in the outer periphery of upper stream member 32 and a circumferential wall 33A of lower stream member 33. Jet passes 34B penetrate from annular groove 32A, continue in a downstream direction, and open into a lower stream passage 35 in lower stream member 33. Jet passes 34B, having small diameters, are disposed at skewed discharge angles, each having a directional component tangent to the inner circumference and transverse to an axis of lower stream passage 35, as shown in FIG. 4. Lower stream passage 35 in lower stream member 33 has a conically tapered entrance portion 37 disposed at the upstream side of lower stream member 33. Air passing through jet passes 34B is directed by conically tapered entrance portion 37 into a downstream portion of lower stream passage 35.

As shown in FIG. 1, high pressure air supply line 4 consists of a high pressure air supply source (air compressor) 40, a high pressure hose 42, a pressure-flow regulating device 41 and a high pressure supply hose 43. The outlet of high pressure supply hose 43 is connected to port 36 by a conventional connector.

Operation of pneumatic transmission apparatus 10 is as follows. The pressure and quantity of air flow generated by high pressure air supply source 40 is set to a predetermined value by pressure-flow regulating device 41. The regulated high pressure air is then supplied to annular passage 34A of connector 3 through high pressure supply hose 43. The supplied high pressure air flows through jet passes 34B, and is discharged into lower stream passage 35. The skewed discharge angles of jet passes 34B are disposed tangentially to the inner circumference of lower stream passage 35, and in a direction towards outlet 31. This creates a high speed, spiral flow of air, which flows in a direction towards outlet 31. The high pressure spiral flow of air continues to flow through second tubular transmission passage 2, to an outlet 2A, where it exits.

The high pressure spiral air flow generated in second tubular transmission passage 2, creates a lowered pressure in first tubular transmission passage 1. As a result, air is sucked into an inlet 1A of first tubular transmission passage 1. Materials (not shown) introduced into inlet 1A are thereby transmitted to connector 3 via the air flow produced by the generated suction in first tubular transmission passage 1.

Materials transmitted toward connector 3 are then transmitted to outlet 2A of second tubular transmission passage 2 via the high pressure air spiral flow produced by spiral flow generating passage 34.

Materials introduced into pneumatic transmission apparatus 10, are spirally transmitted near the axis of second tubular passage 2. Consequently, the stalling phenomenon does not occur, thereby permitting longer transmission distance.

The level of pressure supplied by high pressure air supply line 4 is determined by the size and mass of the materials introduced into pneumatic transmission apparatus 10.

In addition, transmission speed in the second tubular transmission passage 2 may be easily regulated by controlling the pressure and flow-rate of the high pressure air. Pressure-flow regulating device 41 in high pressure air supply line 4 allows such simple and precise regulation.

The transmission speed increases with higher pressure. As the air pressure increases, the rate of the axial component compared with the spiral component of the high pressure air spiral flow also increases. The lead (lead of thread) of the high pressure air spiral flow becomes large, resulting in a high transmission speed.

Conversely, decreasing the supply air pressure reduces the transmission speed. Because the rate of the axial component compared with the spiral component of the high pressure air spiral flow decreases with reduced pressure, the lead of the high pressure air spiral flow becomes small. This results in a low transmission speed.

Since the transmission speed is easily regulated as described above, the present invention can be applied to the transmission of materials requiring low speed. This allows a wider range of transmissible materials.

As previously mentioned, the materials are transmitted spirally near the axis of the second tubular transmission passage 2 by the high pressure air spiral flow. If the second tubular transmission passage 2 contains a corner or sharp bend, a collision of materials with the second tubular transmission passage 2, or the transmitted materials with one another, is avoided. Since damage to more fragile materials is prevented, this too permits a wider range of materials to be transmitted. Also, by reducing internal abrasion, the useful life of second tubular transmission passage 2 is extended.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is;

1. A pneumatic transmission apparatus comprising:
   a first and a second tubular transmission passage;
   a connecter including means for joining said first tubular transmission passage with said second tubular transmission passage;
   said connector including a lower stream member and an upper stream member;
   an outlet at a downstream side of said lower stream member;
   an inlet at an upstream side of said upper stream member;
   said lower and upper stream members including means for joining an upstream side of said lower stream member to a downstream side of said upper stream member;
   said upstream member and said downstream member forming a continuous passage within said connector, connecting said inlet with said outlet;
   a port for receiving a supply of pressurized air;
   said port being disposed between said inlet and said outlet;
   an annular passage in communication with said port within said connector;
   said annular passage disposed coaxially about said continuous passage;
   said annular passage defined by boundaries of both said lower and upper stream members;
   said continuous passage including a lower stream passage;
   a plurality of jet passes providing communication between said annular passage and said lower stream passage;
   said lower stream passage being disposed between discharge openings of said plurality of jet passes and said outlet;
   said plurality of jet passes each having a discharge angle facing at least partially downstream;
   each said discharge angle having a directional component tangential to an inner circumferential wall of said lower stream passage, whereby air, discharged into said lower stream passage from said plurality of jet passes, produces a spiral air flow exiting said outlet and a suction at said inlet.

2. A connector for a pneumatic transmission apparatus comprising:
   a central passage;
   inlet means for admitting a material to be transmitted to said central passage;
   outlet means for discharging said material from said central passage;
   means for supplying a flow of a gas into said central passage; and
   said means for supplying including means for producing a spiral flow of said gas directed toward said outlet means, whereby material entering said inlet means is urged through said connector and in a spiral path through said outlet means;
   a passage within said connector;
   a plurality of jet passes communicating between said passage and said outlet means;
   said plurality of jet passes each having a discharge angle;
   said central passage including a conically tapered portion having a widened diameter at an upstream side and a narrowed diameter at a downstream side;
   said plurality of jet passes arranged to discharge into said widened diameter of said conically tapered portion; and
   each said discharge angle having a directional component tangential to an inner circumferential wall of said central passage, whereby air, discharged into said central passage from said plurality of jet passes, produces said spiral air flow within said central passage downstream of said jet passes.

3. A pneumatic transmission apparatus comprising:
   an inlet passage;
   an outlet passage;
   a conically tapered entrance portion intermediate said inlet passage and said outlet passage;
   said conically tapered entrance portion tapering from a maximum diameter wider than said inlet portion to a minimum diameter equal to said outlet portion;
   a plurality of jet passes entering said conically tapered entrance portion in said maximum diameter; and
   each of said jet passes being skewed with respect to an axis of said outlet passage and directed to flow a spiral flow of air generally parallel to an inner surface of said conically tapered entrance portion.

* * * * *